(12) United States Patent
Bartley et al.

(10) Patent No.: US 6,234,270 B1
(45) Date of Patent: May 22, 2001

(54) VEHICLE HAVING HYDRAULIC AND POWER STEERING SYSTEMS USING A SINGLE HIGH PRESSURE PUMP

(75) Inventors: Bradley E. Bartley, Manito; James R. Blass, Bloomington; Dennis H. Gibson, Chillicothe, all of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/235,359

(22) Filed: Jan. 21, 1999

(51) Int. Cl.⁷ ....................................................... F02M 7/00
(52) U.S. Cl. ........................................... 180/417; 123/446
(58) Field of Search ..................................... 180/442, 417, 180/421, 441; 123/446

(56) References Cited

U.S. PATENT DOCUMENTS

| | | |
|---|---|---|
| 3,606,051 | 9/1971 | Peterson et al. . |
| 3,659,567 | 5/1972 | Murray . |
| 4,189,919 | 2/1980 | Gosunski, Jr. . |
| 4,285,200 | 8/1981 | Byrne et al. . |
| 4,432,493 | 2/1984 | Moser et al. . |
| 5,168,703 | 12/1992 | Tobias . |
| 5,285,641 | 2/1994 | Goto et al. . |
| 5,297,523 | * 3/1994 | Hafner et al. .......................... 123/456 |
| 5,299,420 | 4/1994 | Devier et al. . |
| 5,333,452 | 8/1994 | Dameron . |
| 5,357,912 | * 10/1994 | Barnes et al. .......................... 123/357 |
| 5,540,203 | 7/1996 | Foulkes et al. . |
| 5,593,002 | * 1/1997 | Okada et al. .......................... 180/421 |
| 5,678,521 | 10/1997 | Thompson et al. . |
| 5,706,780 | 1/1998 | Shirakawa . |
| 5,842,452 | * 12/1998 | Pattanaik .............................. 123/467 |
| 6,014,956 | * 1/2000 | Cowden et al. ....................... 123/446 |

FOREIGN PATENT DOCUMENTS

| | | |
|---|---|---|
| 35 19 650 A1 | 12/1986 | (DE) . |
| 197 11 682 | 11/1997 | (DE) . |
| 196 30 407 A1 | 1/1998 | (DE) . |
| 2 320 523 | 6/1998 | (GB) . |

* cited by examiner

Primary Examiner—Brian L. Johnson
Assistant Examiner—Tony Winner
(74) Attorney, Agent, or Firm—Liell & McNeil

(57) ABSTRACT

A vehicle comprises a plurality of wheels attached to a vehicle housing. Also attached to the vehicle housing is a power steering system, including a fluid flow circuit, which is operably coupled to a number of the wheels. An internal combustion engine attached to the vehicle housing is connected to a hydraulically actuated system that includes a high pressure pump. An outlet of the high pressure pump is in fluid communication with the fluid flow circuit.

14 Claims, 2 Drawing Sheets

US 6,234,270 B1

VEHICLE HAVING HYDRAULIC AND POWER STEERING SYSTEMS USING A SINGLE HIGH PRESSURE PUMP

The Government has the rights in this invention pursuant to Contract No. DE-AC05-97OR22605 awarded by the U.S. Department of Energy.

TECHNICAL FIELD

The present invention relates generally to vehicles having both power steering and hydraulic systems, and more specifically to hydraulic and power steering systems driven by a single pump.

BACKGROUND ART

Traditionally, power steering systems installed in vehicles have been powered by a separate power steering pump. For vehicles including both a hydraulic fuel system and a traditional power steering system, multiple engine hydraulic pumps were a necessity. To make engines more compact and reliable, it is desirable to reduce the number of engine pumps.

The present invention is directed to overcoming one or more of the problems set forth above.

SUMMARY OF THE INVENTION

A vehicle comprises a plurality of wheels attached to a vehicle housing. Also attached to the vehicle housing is a power steering system, including a fluid flow circuit, which is operably coupled to a number of the wheels. An internal combustion engine attached to the vehicle housing is connected to a hydraulically actuated system that includes a high pressure pump. An outlet of the high pressure pump is in fluid communication with the fluid flow circuit.

BEST MODE FOR CARRYING OUT THE INVENTION

Figure 1:
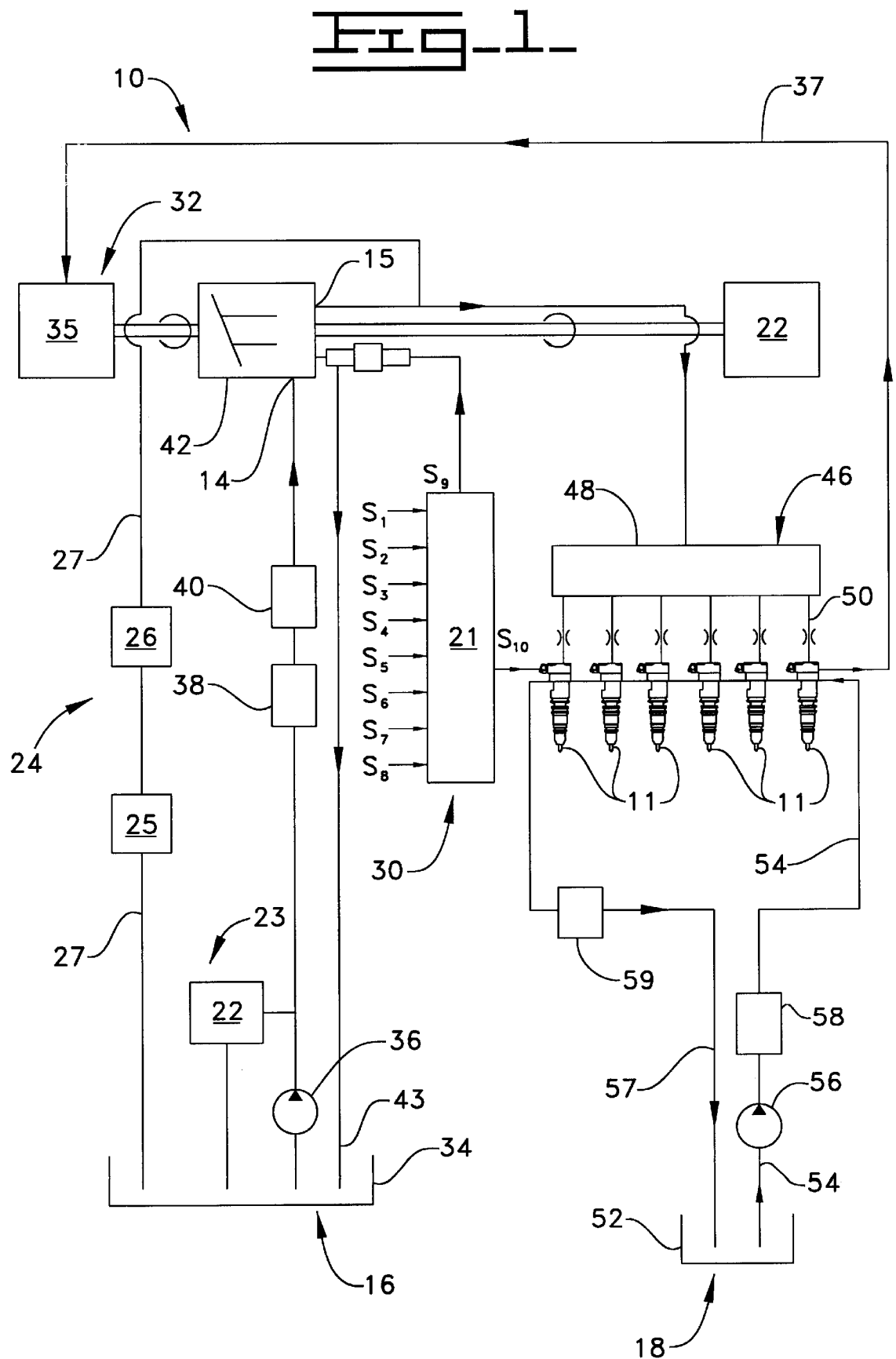
FIG. 1 is a schematic view of a power steering and hydraulically-actuated system according to the present invention.

Referring to FIG. 1, there is shown a schematic representation of a power steering system 24 and a hydraulically actuated fuel injection system 10 as adapted for a direct injection diesel cycle internal combustion engine 22. The fuel injection system 10 includes at least one fuel injector 11, all of which are adapted to be positioned in a respective cylinder head bore of engine 22. The fuel injection system 10 includes a source of actuation fluid 16 which supplies actuation fluid to each fuel injector 11, as well as to an engine lubricating circuit 23 and power steering circuit 24. While any available engine fluid could be used as the actuation fluid in this system, the present invention preferably utilizes engine lubricating oil. This allows fuel injection system 10 to be connected directly to engine lubricating circuit 23. The fuel injection system 10 also includes a source of fuel 18 for supplying fuel to each fuel injector 11. A means for recirculating actuation fluid 32 containing a hydraulic motor 35 is included in fuel injection system 10. The means for recirculating actuation fluid 32 is capable of recovering energy from the actuation fluid leaving each of the fuel injectors 11. A computer 30 is also included in fuel injection system 10 to control timing and duration of injection events.

The source, of actuation fluid 16 preferably includes an engine oil pan 34, an actuation fluid cooler 38, one or more actuation fluid filters 40 and a low pressure pump 36 for supplying oil or actuation fluid to both engine lubricating circuit 23 and fuel injection system 10. The source of actuation fluid 16 also preferably includes high pressure pump 42 for generating high pressure in the actuation fluid and at least one high pressure manifold 46. High pressure pump 42 includes an inlet 14 connected to an outlet of low pressure pump 36, and an outlet 15. Both power steering circuit 24 and high pressure manifold 46 are connected to outlet 15. The location of power steering circuit 24 as related to high pressure manifold 46 is a matter of design choice. For instance, power steering circuit 24 could be connected to high pressure manifold 46 at a downstream location instead of in the manner shown in FIG. 1.

A rail branch passage 50 connects a high pressure actuation fluid inlet of each fuel injector 11 to high pressure common rail 48. Actuation fluid exiting fuel injector 11 flows through a low pressure actuation fluid drain which is connected to the means for recirculating actuation fluid 32 via a recirculation passage 37. A portion of the recirculated actuation fluid is channeled to high pressure pump 42 and another portion is returned to oil pan 34 via a recirculation line 43 and recirculated by low pressure pump 36.

Actuation fluid is delivered to power steering circuit 24 by high pressure pump 42 via a flow passage 27 which branches from high pressure pump 42. Power steering circuit 24 preferably includes a hydraulic cylinder 25 and a power steering box 26. Actuation fluid can flow into power steering circuit 24 through outlet 15 via a flow passage 27. Actuation fluid is channeled through power steering circuit 24 by flow passage 27 which returns it to oil pan 34. While a pressure reduction valve has not been shown, it should be appreciated that a pressure reduction valve would be required if it is desirable for power steering circuit 24 to operate at a different pressure than fuel injection system 10.

The source of fuel 18 preferably includes a fuel supply regulating valve 59 and a fuel circulation and return passage 57 arranged in fluid communication between fuel injectors 11 and fuel tank 52. Fuel is supplied to fuel injectors 11 via a fuel supply passage 54 arranged in fluid communication between fuel tank 52 and the fuel inlet of each fuel injector 11. Fuel being supplied through fuel supply passage 54 travels through a low pressure fuel transfer pump 56 and one or more fuel filters 58.

Fuel injection system 10 is electronically controlled via computer 30 which includes an electronic control module 21 that controls the timing and duration of injection events and pressure in high pressure manifold 46. Based upon a variety of input parameters including temperature, throttle, engine load, etc. ($S_1$–$S_8$) electronic control module 21 can determine a desired injection timing duration and manifold pressure to produce some desired performance at the sensed operating conditions. Electronic control module 21 could also control a pressure control valve included in power steering circuit 24, if desired.

Figure 2:
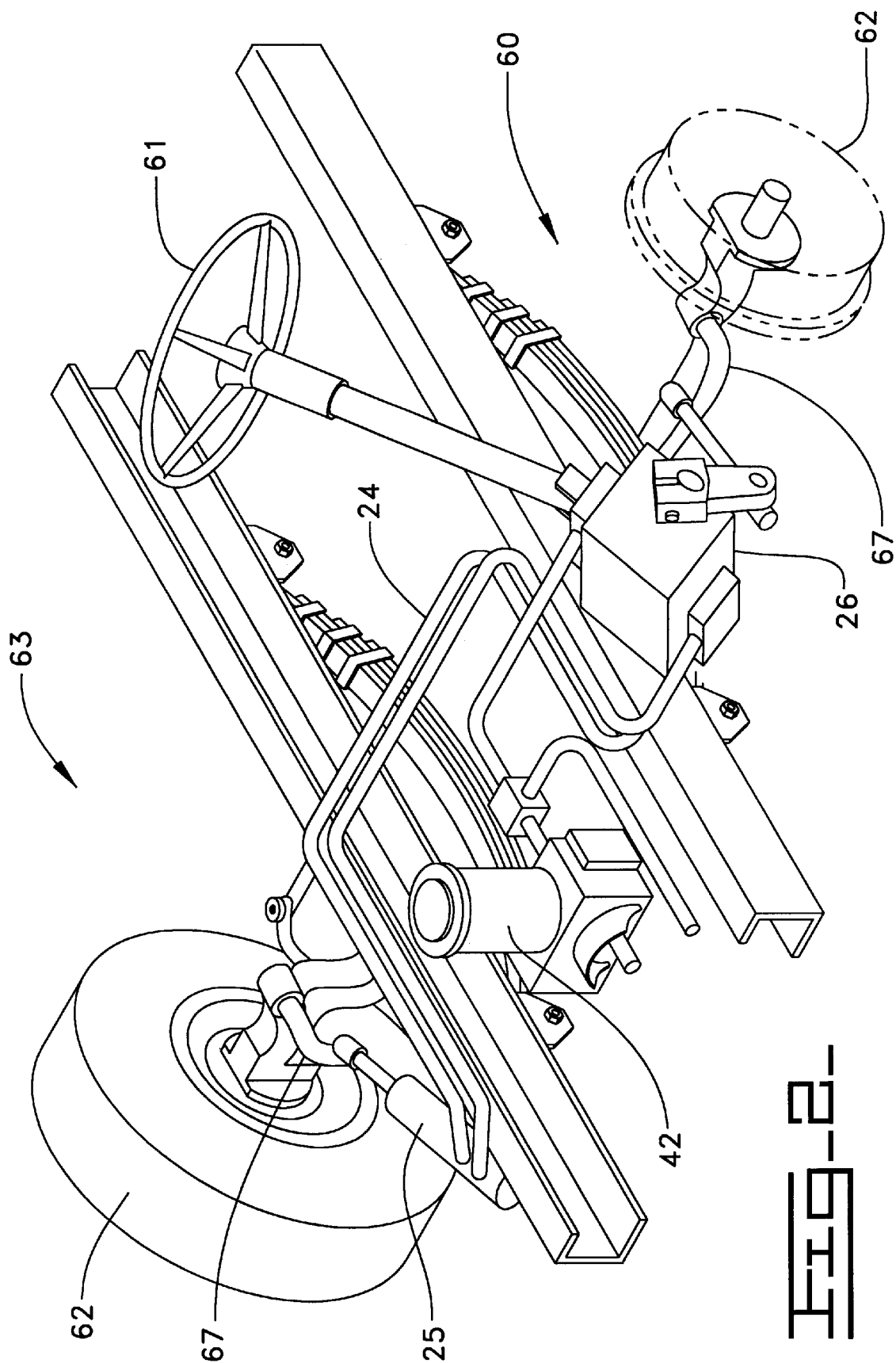
FIG. 2 is a diagrammatic perspective view of a portion of a vehicle having a power steering system according to the present invention.

Referring now to FIG. 2, there is shown a portion of a vehicle housing 69 of a vehicle 60 according to the present invention. Power steering circuit 24 is attached to vehicle housing 69 and includes hydraulic cylinder 25 and power steering box 26. Fluid flow to hydraulic cylinder 25 is controlled by a valve within power steering box 26. Hydraulic cylinder 25 is connected to at least one wheel 62 by a linkage system 67. Power steering box 26 is connected to a steering wheel 61 which is responsible for controlling vehicle 60. Power steering circuit 24 is powered by actuation fluid delivered by high pressure pump 42. Recall that unlike in previous systems, high pressure pump 42 controls both power steering circuit 24 and fuel injection system 10.

Industrial Applicability

Recall that the actuation fluid used by the present invention is engine lubricating oil. Actuation fluid pumped by low pressure pump 36 is directed through engine lubricating circuit 23. After this actuation fluid has performed work in engine lubricating circuit 23 it flows back into oil pan 34 where it will be recirculated. A portion of oil pumped by low pressure pump 36 is channeled to high pressure pump 42 rather than to engine lubricating circuit 23.

Actuation fluid pumped by high pressure pump 42 is directed to both power steering circuit 24 and high pressure manifold 46. A first amount of actuation fluid exits high pressure pump 42 through outlet 15 and flows into power steering circuit 24 via flow passage 27. This first amount of actuation fluid is returned to oil pan 34 for recirculation by flow passage 27 upon exiting power steering circuit 24. A second amount of actuation fluid exits high pressure pump 42 through outlet 15 and flows to high pressure manifold 46. The actuation fluid flows into fuel injectors 11 via a series of rail branch passages 50 from high pressure manifold 46. After performing work in fuel injectors 11, actuation fluid flows through recirculation passage 37 to oil pan 34 for recirculation. The present invention is also believed to improve the robustness of the complete engine by eliminating the need for one pump.

The present invention improves upon previous power steering systems by consolidating the high pressure hydraulic system pump with the power steering pump. By powering the power steering system with the high pressure hydraulic system pump, the need for multiple pumps is eliminated, thus reducing the amount of engine space needed for the systems.

It should be understood that the above description is intended only to illustrate the concepts of the present invention, and is not intended to in any way limit the potential scope of the present invention. For instance, while a pressure reduction valve has not been shown, it should be appreciated that such a device could be added when it is desirable to operate the fuel injection system at a different pressure than the power steering system. Thus, various modifications could be made without departing from the intended spirit and scope of the invention as defined by the claims below.

What is claimed is:

1. A vehicle comprising:
a vehicle housing with a plurality of wheels attached thereto;
a power steering system attached to said vehicle housing and being operably coupled to a number of said wheels, and including a fluid flow circuit;
an internal combustion engine attached to said vehicle housing;
an engine lubricating system attached to said internal combustion engine and including a low pressure pump;
a hydraulically actuated system attached to said internal combustion engine and including a high pressure pump; and
said fluid flow circuit being in fluid communication with an outlet from said high pressure pump.

2. The vehicle of claim 1 wherein said engine includes an oil pan;
said high pressure pump having an inlet fluidly connected to an outlet from said low pressure pump; and
said low pressure pump having an inlet fluidly connected to said oil pan.

3. The vehicle of claim 2 wherein said hydraulically actuated system includes a plurality of hydraulically actuated fuel injectors.

4. The vehicle of claim 1 wherein said hydraulically actuated system includes a high pressure common rail and a plurality of hydraulically actuated devices;
a pressure control device attached to said common rail; and
an electronic control module attached to said vehicle housing, and being in communication with, and capable of controlling, said pressure control device and said hydraulically actuated devices.

5. A combined hydraulic and power steering system comprising:
a high pressure pump having at least one outlet;
a power steering circuit having a flow passage with one end fluidly connected to said at least one outlet;
an engine lubricating system including a low pressure pump; and
a hydraulic circuit having a plurality of hydraulically actuated devices with inlets fluidly connected to said at least one outlet.

6. The system of claim 5 further comprising an engine operably coupled to said high pressure pump;
said hydraulic circuit and said power steering circuit containing a common fluid originating from an oil pan of said engine; and
said hydraulically actuated devices being attached to said engine.

7. The system of claim 6 further comprising an electronic control module in communication with and being capable of controlling said hydraulically actuated devices.

8. The system of claim 7 wherein said high pressure pump includes an inlet fluidly connected to an outlet from said low pressure pump.

9. The system of claim 5 wherein said flow passage has another end fluidly connected to a fluid reservoir;
said hydraulic devices having outlets fluidly connected to said fluid reservoir; and
said high pressure pump having an inlet fluidly connected to said fluid reservoir.

10. A combined hydraulically actuated fuel injection and power steering system comprising:
a high pressure pump having an inlet fluidly connected to a source of fluid and at least one outlet;
a power steering circuit having a flow passage with one end fluidly connected to said at least one outlet;
a high pressure common rail fluidly connected to said at least one outlet;
said source of fluid being an engine lubrication system;
a plurality of hydraulically actuated fuel injectors fluidly connected to said common rail;
said engine lubrication system including a low pressure pump arranged in series with said high pressure pump.

11. The combined system of claim 10 wherein each of said fuel injectors includes a fuel inlet fluidly connected to a source of fuel fluid, and a hydraulic fluid inlet fluidly connected to said common rail.

12. The combined system of claim 11 including an electronic control module in communication with and being capable of controlling said hydraulically actuated fuel injectors.

13. The combined system of claim 12 further comprising a rail pressure control device attached to said common rail.

14. The vehicle of claim 1 wherein said high pressure pump and said low pressure pump are arranged in series.

* * * * *